INVENTORS
Herbert Behrens
Peter Frerichs
BY
Michael S. Striker
ATTORNEY

INVENTORS
Herbert Behrens
Peter Frerichs
BY
Michael S. Striker
ATTORNEY

April 14, 1970    H. BEHRENS ET AL    3,506,188
RECIPROCATING DRIVE ARRANGEMENT
Filed May 27, 1968    4 Sheets-Sheet 4

INVENTORS
Herbert Behrens
Peter Frerichs
BY
Michael S. Striker
ATTORNEY

United States Patent Office 3,506,188
Patented Apr. 14, 1970

3,506,188
RECIPROCATING DRIVE ARRANGEMENT
Herbert Behrens, Neuenburg, and Peter Frerichs, Wilhelmshaven, Germany, assignors to Olympia Werke AG, Wilhelmshaven, Germany
Filed May 27, 1968, Ser. No. 732,364
Claims priority, application Germany, May 29, 1967, 1,549,824; Nov. 22, 1967, 1,549,830
Int. Cl. G06k 1/05, 5/02
U.S. Cl. 234—34       18 Claims

ABSTRACT OF THE DISCLOSURE

The inner ends of articulated first and second toggle links are reciprocated by a drive means, and the outer ends of the toggle links are guided by first and second guide levers along circular paths. The outer end of the first link is connected with a driven element, such as a punch. When a first blocking means is actuated to block the first guide lever, the punch is not operated, and when a second blocking means is actuated to block the second guide lever, the first link performs a working stroke with the punch.

BACKGROUND OF THE INVENTION

The present invention relates to a drive arrangement which is particularly suitable for operating punches at a high speed.

In punching devices according to the prior art, a drive member is oscillated by a rotary eccentric, and when the drive member is completely retracted, a coupling means is operated to couple the drive member with a selected punch. In apparatus of this type, the drive member must be withdrawn a great distance from the punches in order to provide sufficient time for the operation of the coupling means. As a result, the drive member moves at a substantial speed when engaging the operative coupling means, which causes noise and wear.

Due to the fact that the drive member must perform longer strokes than the punches to permit the actuation of the coupling means, time is lost during every stroke which reduces the speed of operation of the punching device.

In accordance with the prior art, electromagnetic means are used for operating the coupling means which require a certain time for building up a magnetic field so that the speed of the actuation of the coupling means cannot be increased, and conventional punching devices cannot exceed a frequency of 150 Hz.

In another known punching device, the rotary eccentric means has such a cam shape that the oscillated drive member stops momentarily while the coupling means are actuated.

While the length of the stroke of the drive member is reduced, a substantial increase of the operational speed cannot be obtained, and noise and wear cannot be reduced. Since the oscillation is not sinusoidal, substantial accelerations and decelerations occur which detrimentally influence the rhythm of the operation.

SUMMARY OF THE INVENTION

It is one object of the invention to overcome the disadvantages of known oscillating or reciprocating drive arrangements, particularly for driving punches, and to provide a drive arrangement which produces little noise, and whose parts are little worn even after long use.

Another object of the invention is to provide a reciprocating drive arrangement by which a punch is selectively operated or not operated, without the use of coupling means.

Another object of the invention is to provide a drive arrangement for operating a punch in a sinusoidal motion.

With these objects in view, one embodiment of the invention comprises actuating means including first and second toggle links whose inner ends are pivotally connected, preferably guide means for guiding the outer ends of the links, drive means for reciprocating the inner ends of the links in one direction so that the outer ends of the links move toward and away from each other in a transverse direction, a driven element, such as a punch, connected with the outer end of the first link for movement with the same, and first and second blocking means for selectively blocking movement of the outer end of the first link or of the outer end of the second link. When the outer end of the first link is blocked against transverse movement, the other link performs a movement which does not influence the punch. When the second blocking means blocks the outer end of the second link, the first link performs a stroke and operates the punch in a working stroke.

In the preferred embodiment of the invention, guide levers are turnable about stationary pivots and are pivotally connected with the outer ends of the links for guiding the same along circular paths, while permitting the links to turn about the respective outer ends of the same. The first and second blocking means respectively cooperate with the first and second guide levers, and when any one of the guide levers is blocked, respective outer ends of the associated link cannot move outwardly so that the outer end of the respective other links performs a long stroke, which can be used for operating a punch.

In contrast to the prior art, the present invention does not employ an oscillating drive member or shiftable coupling means so that it is not necessary to accelerate and decelerate movable parts.

The blocking means of the invention are preferably electrically energized, so that one blocking means is energized and actuated when a punching stroke is to be performed by the punch, and the other blocking means is energized when no stroke of the punch is desired. Consequently, an electric pulse supplied to one of the blocking means will cause a punching operation, and an electric pulse supplied to the other blocking means will cause an idle stroke and no operation of the punching means. The energization of the blocking means requires no time, as compared with the shifting of coupling means, so that the working speed of the apparatus is increased as compared with the prior art.

In one embodiment of the invention the blocking means include electromagnetic means whose armatures are secured to the guide levers of the links.

In another embodiment of the invention, a semiconductor member is energized for braking a corresponding brake portion on the respective guide lever.

It is advantageous to place each electromagnetic blocking means in a substantially rectangular space bounded by a link and the associated guide lever. The guide levers are mounted on stationary pivots provided on the yokes of the electromagnetic blocking means.

The drive means preferably include a crank or eccentric and a drive arm reciprocated by the same and connected with the pivot between the first and second links. The drive arm is advantageously located between the first and second blocking means. The energization or deenergization of the electromagnetic blocking means can take place during the entire return stroke of the drive arm while the crank or eccentric member turns an angle of 180°.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
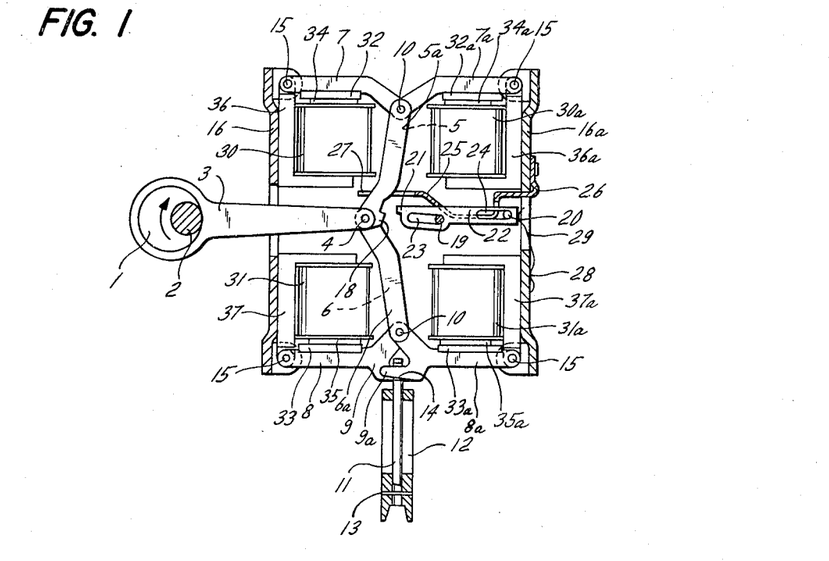
FIG. 1 is a side elevation, partially in section, illustrating a first embodiment of the invention in one operational position.
Figure 3:
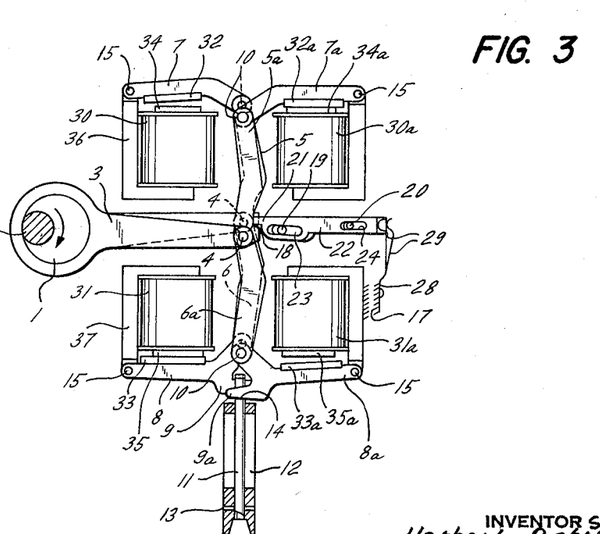
FIG. 3 is a side elevation, partially in section, illustrating the embodiment of FIGS. 1 and 2 in another operational position in which a selected punch is operated.

The drawings illustrate the drive arrangement of the invention applied to a punching device having a row of punches 11 guided in bores of a frame 12 movable between the inoperative position shown in FIG. 1, and the operative position shown in FIG. 3 in which punch 11 passes through a slot 13 into which a card is inserted. Only one punch of the row of punches is visible in the drawing. A shaft 2 extends parallel to the row of punches and carries a plurality of eccentric circular members 1 which respectively control drive arms 3 which operate actuating means for the punches, respectively. Two actuating means for two punches 11 are shown in FIG. 1 in partly superimposed position. First and second toggle links 5a and 6a are connected at their inner ends by a pivot 4 to each other and to the respective arm 3. The outer ends of links 5a and 6a are connected by pivots 10 to the ends of guide levers 7a and 8a which are mounted on stationary pivots 15. Guide lever 8a has a coupling nose 9a projecting into a lateral cutout 14 of the foremost punch 11. Directly behind links 5a and 6a, links 5 and 6 are disposed whose inner ends are also connected by a pivot pin 4 to each other and to the respective drive arm 3, while the outer ends of links 5 and 6 are connected by pivots 10 to guide levers 7 and 8 which are supported on stationary pivots 15. Guide lever 8 has a coupling nose 9, see FIG. 3, located in the cutout 14 of the next punch 11 in the row of punches.

Figure 1A:
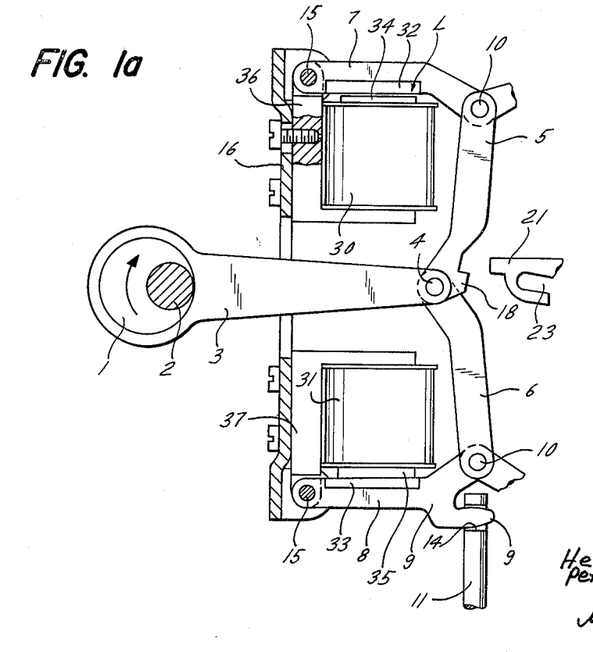
FIG. 1a is a fragmentary side elevation, partially in section, and illustrating the embodiment of FIG. 1 on an enlarged scale in the same operational position.
Figure 2:
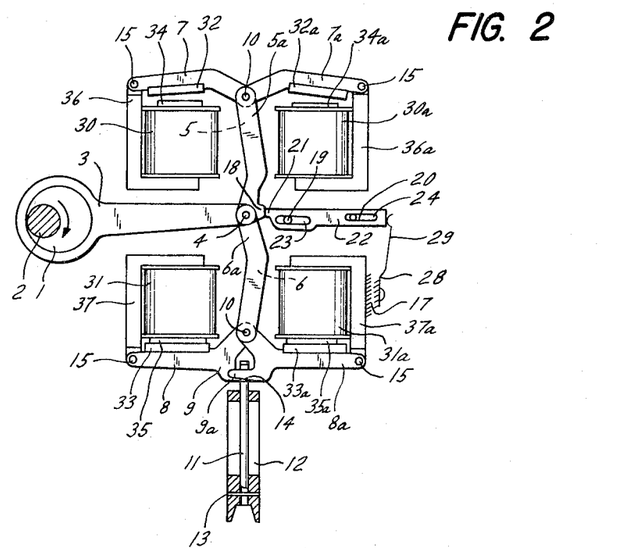
FIG. 2 is a side elevational, partially in section, illustrating the apparatus of FIG. 1 in another operational position in which no punch is actuated.

In FIGS. 1, 1a and 2, the toggle links and pivots 10 and 4 of successive actuating means for successive punches are superimposed, while FIG. 3 illustrates the foremost actuating means in a displaced position for moving punch 11 to a punching position.

Guide levers 8, 8a and links 6, 6a actuate punches, while guide levers 7, 7a and links 5, 5a perform a control function.

The guide members 7, 7a, 8, 8a of each actuating means are controlled by blocking means which can be selectively actuated to block angular movement of selected guide members, or permit displacement of the same due to the action of the drive means 1, 3 on the respective toggle link. The arrangement is such that in each actuating means either guide lever 7 (7a) or guide lever 8 (8a) is blocked permitting the other guide lever to be angularly displaced together with the respective toggle lever by the action of the reciprocating drive arm 3. In the embodiment illustrated in FIGS. 1 to 3, the blocking means are shown to be electromagnetic means 30, 31 and 30a, 31a, respectively. The electromagnets have cores 34, 35 and 34a, 35a surrounded by windings and cooperating with armatures 32, 33 and 32a, 33a secured to guide levers 7, 8 and 7a, 8a respectively.

The windings of each pair of electromagnets 30, 31, for example, are selectively energized for example by a conventional flip-flop circuit. In accordance with the program, either electromagnet 30, or electromagnet 31 is energized. Assuming that a command signal "punch" is supplied to electromagnet 30, armature 32 is attracted, guide lever 7 is blocked and the reciprocating stroke of drive arm 3 to the left cannot displace link 5. Consequently, link 5 will pivot about pivot pin, and link 6 will perform a downward stroke by which the respective punch is actuated.

When a command signal "no punching" is supplied to electromagnet 31, armature 33 is attracted, guide lever 8 is blocked and cannot move the respective punch so that the reciprocating stroke of drive arm 3 moves link 5 and guide lever 7 in an idle movement.

It is evident that the electromagnets 30, 31 of the actuating means of each punch can be selectively operated by electric pulses representing either "punching" or "no punching."

In the embodiment of FIGS. 1 to 3, the guide lever 7 or 8, the toggle link 5 or 6, and the drive arms 3 bound three sides of a substantially rectangular space in which electromagnetic blocking means 30, or 31, respectively, is arranged. The stationary pivot 15 of each guide lever 7 or 8, is mounted on the yoke 36 or 37 of the associated electromagnetic blocking means 30 or 31. The flux flows through the yokes 36, 37, the cores 34, 35, the armatures 32, 33 and through parts of guide levers 7 and 8. The yokes 36, 37 are mounted on a lateral frame structure 16.

The right side of the device is constructed in the same manner, and the yokes 36a and 37a of the electromagnetic blocking means 30a and 31a are mounted on the lateral frame structure 16a.

Due to the fact that the electromagnetic blocking means are arranged in the rectangular spaces formed by the levers of the actuating means, the construction is extremely compact and space-saving.

It will be understood that the actuating means and blocking means are arranged in two rows and that the elements of the row on the right are indicated by the same reference numerals as corresponding elements on the left, but provided with a subscript a. The units of the row on the right are staggered relative to the units of the row on the left, for example, a guide lever 7a is located opposite a space between two guide levers 7. However, the links form rows in which links 5 and 5a or 6 and 6a alternate, and each pair of links is actuated by a drive arm 3, all drive arms being located on the same side and operated by a common shaft 2. The coupling noses 9 and 9a project from opposite sides into the cutouts of successive punches 11 of the row of punches.

The toggle links 5, 6 have a greater length than the electromagnetic blocking means 30, 31 so that a space remains between the blocking means 30 and 31 into which the drive arms 3 project. A corresponding space is free between electromagnetic blocking means 30a and 31a, and is used for a control member 22 which has slots 23, 24 for supporting control member 22 on a pair of pins 19, 20 for movement in the direction of reciprocation of drive arm 3. The control members 22 form a row and are respectively guided in slots of a comb-shaped guide plate 25 which is secured by a fastening means 26 to the frame wall 16a. Guide plate 25 has slots 27 for guiding the closely spaced links 5 and 5a so that the same are located in the same planes as the respective control members 22.

A comb-shaped spring means 28 is also secured to frame wall 16a and has a row of spring elements which respectively abut the ends of control members 22 for urging the same to the position illustrated in FIG. 1 in which pins 19 and 20 are located at the ends of slots 23 and 24. Each control member has a projecting blocking portion 21 cooperating with a nose 18 on the respective associated link 5 or 5a.

The electromagnetic blocking means 30, 30a, 31, 31a are adjustably mounted on the frame walls 16 and 16a by holding screws located in slots of the frame walls, as shown in FIG. 1a. The electromagnets are adjusted so that in the retracted position of drive arm 3 shown in FIG. 1a, a narrow air gap L is formed between the core and armature of an electromagnetic blocking means 30 which is not energized, as shown in the upper portion of FIG. 1a for core 34 and armature 32. Energized electromagnetic blocking means attract the respective armature to abut on the core, as shown in the lower portion of FIG. 1a for armature 33 and core 35. Due to this arrangement, the armatures do not impinge during the operation on the cores, and noise and wear is eliminated. For example, if electromagnetic blocking means 31 is energized, the respective punch 11 is not moved to a punching position since guide lever 8 with armature 33 is attracted to core 35 whereby a clockwise actuating motion of guide lever 8 is blocked. The reciprocating stroke of drive arm 3 to the right in FIG. 1a will pivot link 6 about the immovable pivot 10, and link 5 will be displaced in its longitudinal direction so that its outer end with pivot 10 turns along a circular path about a stationary pivot 15, while the armature 32 moves away from core 34. It will be seen that, if electromagnetic blocking means 31 is energized, continuous rotation of shaft 2 and reciprocation of drive arm 3 will result in idle movements of the linkage 5, 7 without any impingement on a stop so that no noise is produced.

If electromagnetic blocking means 30 is energized, armature 32 is attracted and guide lever 7 turns a very small angle to close gap L which, due to the small width of the gap, produces practically no noise. When guide lever 7 is thus blocked, link 5 pivots about the immovable pivot 10 when drive arm 3 performs a stroke to the right as viewed in FIG. 1a so that link 6 performs an outward and downward movement, turning guide lever 8 about stationary pivot 15 in clockwise direction for actuating punch 11 to perform a downward stroke.

In a modified arrangement, a spring may be substituted for electromagnetic blocking means 30 and bias guide lever 7 in clockwise direction. When electromagnetic blocking means 31 is not energized, the force of the spring is sufficient to block guide lever 7 while link 6 with guide lever 8 perform a downward and outward stroke for actuating punch 11. When actuation of the punch is not desired and electromagnetic blocking means 31 is energized and blocks movement of guide lever 8 in clockwise direction, the force transmitted by drive arm 3 to the toggle lever 5 overcomes the spring force, and guide lever 7 is turned in an idle movement in counterclockwise direction.

During normal operations, drive shaft 2 rotates continuously and drive arms 3 reciprocates pivots 4 so that each pair of toggle links 5, 6 is once spread and once placed in an angular position during each complete revolution of shaft 2. During this reciprocating movement, the electromagnetic blocking means are selectively energized. The arrangement is such that each blocking means 31 (31a) for guide levers 8 (8a) is energized by a pulse "no punching" and each blocking means 30 (30a) for guide levers 7 (7a) is energized by a pulse "punching." The armatures 32 or 32a, 33 or 33a, together with magnet cores 34 or 34a, 35 or 35a effect the blocking of the guide levers. It is important that the blocking forces are effective in substantially the same direction as the corresponding parts of the guide levers 7, 7a, 8, 8a.

This construction has great advantages since the electromagnetic forces do not have to accelerate or decelerate masses and to overcome inertia of movable elements. The arresting or release of the guide levers is accomplished by a simple electrical operation, such as closing of a switch by which an electromagnetic blocking means is energized.

FIG. 2 shows an operational condition of the device in which the toggle links 5, 6 and 5a, 6a of two units are spread to a position in which the pivots 10 at the outer ends of the links are spaced the greatest distance due to a drive stroke towards the right of the reciprocating drive arm 3. In both units, the command pulse "no punching" was received so that electromagnetic blocking means 31 and 31a were energized and hold the armatures 33 and 33a so that the respective punches 11 cannot be operated by levers 8, 9 and 8a, 9a.

The electromagnetic blocking means 30 and 30a are not energized since the command "punching" was not given. Consequently, the stroke of drive arm 3 and the holding of the pivots 10 of links 6 and 6a has caused a movement of the outer ends of links 5 and 5a in outward direction so that guide levers 7 and 7a are raised by pivot 10 to the illustrated position in which armatures 32, 32a are spaced from cores 34, 34a.

Since due to the blocking of the lower pivot 10 and of links 6, 6a, pivot 4 has been raised with links 5, 5a, the projecting portions 18 of links 5, 5a are located in a higher position than in FIGS. 1 and 1a and opposite the blocking portions 21 of the respective control members 22 so that the same were shifted to the right against the actions of the springs 29 during the stroke of drive arm 3. Consequently, control member 22 had no influence on the operation which resulted in no punching operations of the two punches 11 controlled by the two illustrated units.

As long as the pulse "no punching" lasts and the electromagnetic blocking means 31, 31a are energized, the respective punches remain in the inoperative position shown in FIG. 2.

If a punching operation is to be performed by one or several punches of the row of punches 11, the respective eletcromagnetic blocking means 31 or 31a is energized by a pulse "punching." Of course, it is also possible that two successive punches have to be actuated in which event both electromagnetic blocking means 31, 31a illustrated in the drawing are energized.

During the return of the eccentric member 1 to the inoperative position of FIGS. 1 and 1a, the links 5, 6, 5a, 6a are moved to an angular position, while guide levers 7, 7a are turned toward the cores 34, 34a. At the beginning of the return stroke of drive arm 3 to the left as viewed in the drawing, the command pulse to the electromagnetic blocking means 30, or to the electromagnetic blocking means 30a, or to both can be given, while the pulses energizing electromagnetic blocking means 31 and 31a are terminated. The entire time required for the return stroke of the drive arm 3 is available for building up the magnetic field of another electromagnetic blocking means, and for the extinguishing of the magnetic field of the previously energized electromagnetic blocking means. For example, if electromagnetic blocking means 31 is energized and electromagnetic blocking means 30 is de-energized, the working stroke of drive arm 3 produces an idle stroke, as explained with reference to FIG. 2. If the respective punch is to perform a punching operation during the next following working stroke, electromagnetic blocking means 30 is energized during the entire return stroke of arm 3 while electromagnetic blocking means 31 is de-energized during the same return stroke. For building up the magnetic field between the armature 32 and the core 34, the entire time is available during which guide lever 7 turns from its farthest position shown in FIG. 2 to the abutting position shown in FIG. 1. A corresponding period is available for the extinguishing of the magnetic field between the armature 33 and the core 35.

In the condition of the apparatus illustrated in FIG. 3, the left unit has received a command pulse "no punching" and the right unit has received a command pulse "punching."

Electromagnetic blocking means 31 is energized by the pulse, armature 33 is attracted, guide lever 8 is blocked, and the respective punch to which guide lever 8 is connected by coupling nose 9, is not operated. At the same time, the links 5, 6 spread during the working stroke of drive arm 3 to the right, and the outer end of link 5 has moved to a position in which armature 32 is spaced from core 34. Control member 22 of the respective unit has been pushed back by projection 18 on link 5 and has exerted no influence on the idle stroke of the left unit.

The command pulse "punching," given to the right unit, has energized electromagnetic blocking means 30a so that armature 32a is attracted and abuts core 3a, while movement of guide lever 7a is blocked together with the outer end of link 5a. The working stroke of drive arm 3 to the right has spread the links 5a, 6a so that the outer end of link 6a has moved downwardly, turning guide lever 8a to a position in which armature 33a is spaced from core 35a, while coupling nose 9a has moved the respective punch 11 downward to a position penetrating slot 13 in which a card may be placed. The connecting pivot 4 of links 5a, 6a is in a lower position together with the projecting nose 18 on the inner end of link 5a. Consequently, nose 18 passes under blocking portion 21 so that it cannot move upwardly while upward pressure is exerted on link 6a by punch 11 encountering resistance.

While the holding force of electromagnetic blocking means 30a, is sufficient for a normal punching operation in which punch 11 penetrates a card, a punched out piece of the card may stick to a place of the card where a hole is to be formed and increase the resistance against the punching action, or some dirt may accumulate between the armatures and the cores and reduce the effectiveness of the electromagnetic blocking means. Under such circumstances, the power of the drive means 1, 2, 3 will effect the punching operation while blocking portion 21 prevents an upward movement of the links 5a, 6a when punch 11 cannot immediately penetrate the card.

Control member 22 which is displaced to the right by the links 5, 6, is returned by spring 29 to its normal position shown in FIG. 1 when the drive arm 3 performs its return stroke.

While control members 22 participate in the operations, they are effective only when one of the electromagnetic blocking means fails.

It is apparent from FIG. 3 that half a revolution of eccentric member 1 and the corresponding stroke of drive arm 3 are available for switching the right unit to a "no punching" position by energizing electromagnetic blocking means 31a and de-energizing electromagnetic blocking means 30a.

The guide members 7, 7a, 8, 8a perform the function of guiding the outer ends of the links along circular paths having centers in stationary pivots 15, the effective portions of the circular paths extending in a direction transverse to the direction of reciprocation of drive arm 3.

The electromagnetic blocking means are shown to operate pivoted armatures which engage the respective core. Other electromagnetic means in which a part of the armature enters a space within the winding may also be used.

Figure 4:
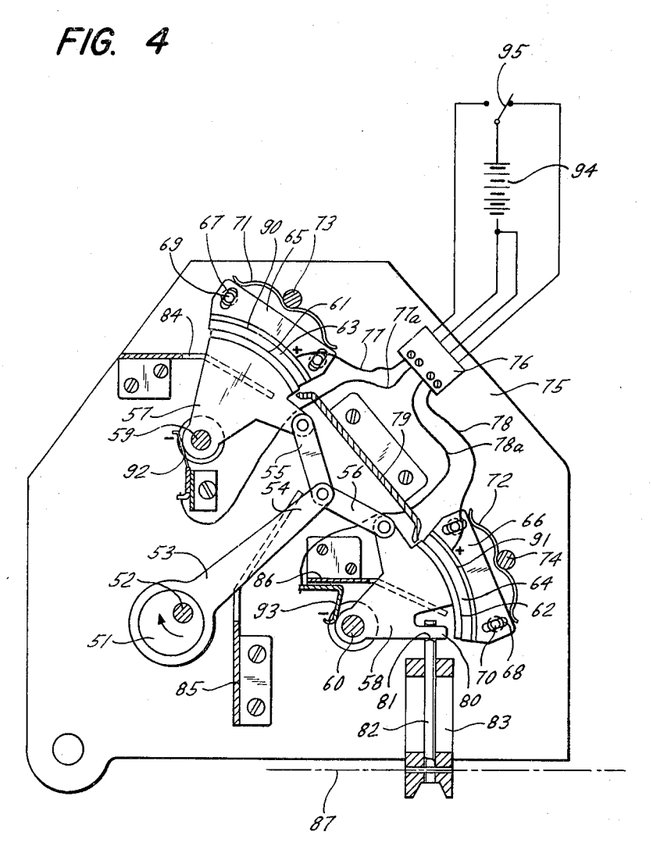
FIG. 4 is a side elevation, partially in section, including a circuit diagram, and illustrating a second embodiment of the invention.
Figure 5:
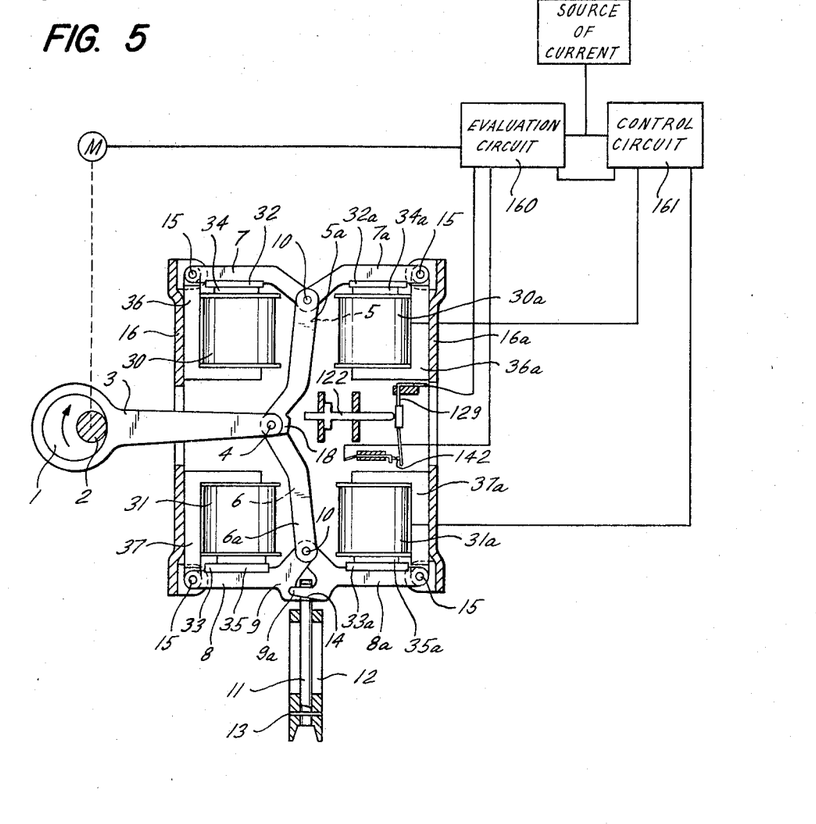
FIG. 5 is a side elevation, partially in section, illustrating a modification of the embodiment of FIG. 1 and including a circuit diagram.
Figure 5A:
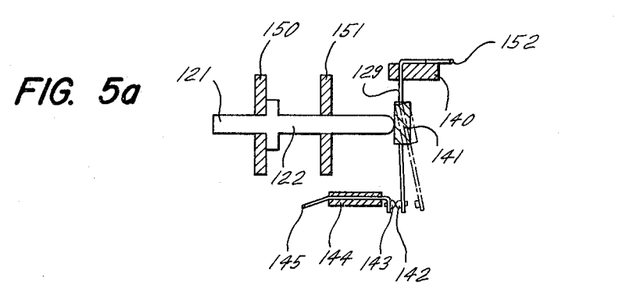
FIG. 5a is a side elevation, partially in section, illustrating a detail of FIG. 5 on an enlarged scale.

The embodiment illustrated in FIGS. 5 and 5a is a modification of the embodiment of FIGS. 1 to 4, and corresponding parts are indicated by like reference numerals. The modification of FIGS. 5 and 5a provides a circuit for comparing the command pulses "punching" or "no punching" with the actual operations performed by the punching units. This is accomplished by transmitting operational motions of the device to control means which control an evaluating device.

The control members 122 perform the function described with reference to control members 22 of FIGS. 1 to 3 and cooperate with blocking noses 18 at the inner ends of links 5 or 5a. Each control member 122 is guided in openings of guide walls 150 and 151 and cooperates with a contact spring 129 by engaging an insulating piece 141 on each contact spring 129. An insulating bar 140 supports all contact springs 129 whose ends are formed as terminals 152 to which connectors may be soldered. The free ends of contact springs 129 have contacts 142 which cooperate with a row of stationary contacts 143 mounted on an insulating support bar 144 and having terminals 145 to which connectors may be soldered.

As explained with reference to the embodiment of FIGS. 1 to 5, projecting nose 18 of each upper toggle link moves along a different path when the unit is set to a punching operation than when the unit is set to perform no punching operation.

When the unit receives the command pulse "no punching" nose 18 fully abuts the blocking portion 121 of control member 22 and pushes the same back so that the respective contact spring 129 is displaced to the position illustrated in broken lines and contacts 142, 143 are separated. When a punching unit receives the command pulse "punching" nose 18 bypasses blocking portion 121 which is thus blocking upward movement of the respective toggle link 6 or 6a, and control member 122 is moved to the right as viewed in the drawing for a shorter distance which is insufficient to lift the respective contact spring 129 and its contact 142 off the stationary contact 143. The closing of a circuit by contacts 142, 143 consequently indicates that a punching operation was carried out, and the opening of contacts 142, 143 indicates that no punching operation was carried out. Pulses indicating a punching operation are transmitted through conductors connected to terminals 152, 145 to an evaluating circuit 160, which may be a so-called "logical circuit," for example, an AND-circuit, which compares the command pulses "punching" and "no punching" given by the control circuit 161 with the signals obtained from contacts 142, 143, and stops a motor M when the actually carried out operation does not conform to the command signal.

Motor M drives shaft 2 so that the same is stopped and the operation discontinued.

Another embodiment of the invention is illustrated in FIG. 4. The mode of operation is the same as in the above-described embodiment, but instead of electromagnetic blocking means, electrostatic blocking means are provided.

The drive shaft 52 drives a row of eccentric members 51 by which drive arms 53 are reciprocated which act on connecting pivots of toggle links 55 and 56. The outer ends of toggle links 55, 56 are pivotally connected with guide members 57, 58 mounted on stationary pivots 59, 60 on a supporting structure 75. Guide member 58 serves as actuating member for the respective punch 82 which is mounted in a frame 83 and has a lateral cutout 81 into which a coupling nose 80 of guide member 58 projects. A card schematically indicated at 87 can be inserted into the slot in the frame 83.

Comb-shaped guide plates 84 have slots for guiding guide members 57 and 58, and a comb-shaped guide structure 85 guides the drive arms 53.

Guide members 57, 58 are substantially sector-shaped and have part circular peripheries to which part-circular brake portions 61 and 62 are secured in positions concentric with the axes of stationary pivots 59 and 60. Brake portions 61, 62 cooperate with matching part-circular semiconductor members 63 and 64 which are connected with electrodes 90 and 91 and supported on carriers 65 and 66.

Each carrier 65 and 66 has slots 67 and 68, respectively, into which guide pins 69, 70 project so that the carriers can be moved with semiconductor members 63 and 64 in radial direction to positions in which the semiconductor members 63 and 64 abut the brake portions 61 and 62.

Carriers 65 and 66 are biased by arcuate springs 71 and 72, which abut rods 73, 74 fixed to parallel frame walls 75 between which the respective punching units are disposed.

Frame plate 75 supports an insulating block 76 to which conductors 77, 77a and 78, 78a are secured. Conductors 77 and 78 are respectively connected with the semiconductor members 63 and 64, and conductors 77a and 78a are respectively connected with contact springs 92 and 93 which are mounted on the frame plate 75 and slidingly engage the hub portions of guide members 57 and 58 which consist of an electrically conducting material.

A stop plate 79 is secured to frame plate 75 extending between shoulders of guide members 57 and 58 and limiting movement of the same toward each other so that guide members 57 and 58, and links 55, 56 are normally in a centered position.

The connectors of the insulating block 76 are respectively connected with a source of voltage 94 by means of a switch 95 which has one position connecting member 63 with the voltage source, and another position connecting member 64 with the voltage source, and more particularly with the positive terminal of the same, the negative terminal of the voltage source being connected with the bodies of guide members 57 and 58.

Due to the action of springs 71 and 72, the rockable brake portions 61 and 62 of guide members 57 and 58 are in contact with the semiconductor members 63 and 64.

When a command pulse "no punching" is given, switch 95 is turned to its right position so that a positive voltage is applied to the arcuate electrode 91 and to the semiconductor member 64, while a negative voltage is applied to guide member 58. An electrostatic braking and blocking field forms between members 64 and 62 by which guide member 58 is arrested in the position shown in FIG. 4. Consequently, punch 82 remains in the illustrated inoperative position.

During a revolution of eccentric member 51 and a stroke of drive arm 53, the inner ends of links 55 and 56 are displaced, and since guide member 58 and the outer end of link 56 are blocked and arrested, the outer end of link 55 moves outward and displaces guide member 57 in an idle stroke. Since no voltage is applied to the arcuate electrode 90 of semiconductor member 63, guide member 57 can freely turn.

If the command "punching" is given, switch 95 is shifted to its left position, and a positive voltage is applied to electrode 90 and semiconductor member 63 so that electrostatic field is produced by which a brake portion 61 and guide member 57 are blocked and arrested. During the following stroke of drive arm 53, link 55 turns about the pivot on the blocked guide member 57, while the outer end of link 56 moves outwardly and turns guide member 58 about the stationary pivot 60 whereby coupling nose 18 moves punch 82 to a punching position penetrating the card 87. Since switch 95 in its left position disconnects the voltage source 94 from the semiconductor member 64, guide member 58 is freely turnable.

As in the previously described embodiments, the return stroke of drive arm 53 moves links 55, 56 to an angular position so that guide member 58 is turned in counterclockwise direction and punch 82 is withdrawn to an inoperative position.

Wear between semiconductor members 63 and 64 and the brake surfaces of brake portions 61 and 62 can be reduced by conventional lubricating means.

Only extremely short time periods are required for the selection of the punches which are to be actuated since the electric blocking fields between members 63, 64 and 61, 62 require a very short time for being built up and extinguished. No mechanical movements are required, since the respective cooperating brake members are in sliding contact with each other.

In all embodiments of the invention, the blocking means participate in no way in the motions required for performing a punching operation, and mechanical coupling means are completely avoided.

It will be understood that each of the elements described above, or two or more together, may also find a useful application in other types of reciprocating drive arrangements differing from the types described above.

While the invention has been illustrated and described as embodied in a punching device including toggle link means and electrically operated blocking means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Reciprocating drive arrangement comprising, in comprising, in combination, actuating means including first and second toggle link means having first and second inner ends and first and second outer ends, and pivot means connecting said inner ends for angular movement; drive means for reciprocating said pivot means and said inner ends in one direction so that said link means move angularly relative to each other, and said first and second outer ends move toward and away from each other in a direction transverse to said one direction; a driven element connected with said first outer end for movement with the same; and first and second blocking means selectively operable for selectively blocking movement of one of said outer ends in said transverse direction so that only the respective other outer end moves in said transverse direction whereby said driven element is not moved when said first blocking means blocks said first outer end, and performs a working stroke when said second blocking means blocks said second outer end.

2. Drive arrangement as claimed in claim 1 wherein said actuating means include first and second guide means for guiding said first and second outer ends, respectively, in said transverse direction.

3. Drive arrangement as claimed in claim 1 wherein said actuating means include first and second stationary pivots, first and second guide members mounted on said stationary pivots, and first and second connecting pivots for connecting said first and second guide members with said first and second outer ends, respectively, for guiding said outer ends along circular paths in said transverse directions and wherein said first and second blocking means act on said first and second guide members, respectively, for selectively blocking the same and thereby said outer ends of said link means.

4. Drive arrangement as claimed in claim 3 wherein said first and second blocking means block outward movement of said first and second outer ends, respectively; and wherein said driven element is a punch so that said punch performs a working stroke when said second guide member is blocked by said second blocking means.

5. Drive arrangement as claimed in claim 3 wherein said first and second blocking means respectively include first and second selectively energizable electromagnetic means respectively including first and second armatures respectively secured to said first and second guide members so that the respective guide member is blocked when a selected armature is attracted.

6. Drive arrangement as claimed in claim 5 wherein said first and second electromagnetic means have first and second yokes, respectively, and windings on said yokes; and wherein said first and second stationary pivots with said first and second guide members are mounted on said first and second yokes, respectively.

7. Drive arrangement as claimed in claim 6 wherein said first and second guide members are first and second guide levers; wherein said first and second link means include first and second links extending substantially at right angles to said first and second guide levers; wherein said drive means include a reciprocating drive arm substantially parallel with said first and second guide levers so that first and second substantially rectangular spaces are bounded by said first guide lever, first link, and said drive arm, and by said second guide lever, second link, and said drive arm; and wherein said first and second armatures and said windings are respectively located in said first and second spaces.

8. Drive arrangement as claimed in claim 6 comprising supporting means for said electromagnetic means including adjusting means for adjusting the positions of the same; and wherein said first and second yokes include first and second cores located in said windings, said first core and said first armature, and said second core and said second armature forming first and second air gaps when the respective winding is not energized, the width of said air gaps being adjustable by operation of said adjusting means.

9. Drive arrangement as claimed in claim 1 wherein said first outer end of first link means has a projection; wherein said driven element is a punch mounted for movement in said transverse direction and having a cutout; and wherein said projection is disposed in said cutout for connecting said first link means with said driven element.

10. Drive arrangement as claimed in claim 1 comprising a control member; means mounting said control member for movement in said one direction; and biassing means for urging said control member into a blocking position for engaging and blocking movement of said second link means in one transverse direction away from said driven element so that the same performs a working stroke in the opposite transverse direction when said second blocking means fails; said link means moving in said one direction engaging said control member and moving the same out of said blocking position thereof when said first blocking means is operative and said driven element is not operated by said first link means.

11. Drive arrangement as claimed in claim 1 wherein said actuating means include first and second stationary pivots, first and second guide members mounted on said stationary pivots, and first and second connecting pivots for connecting said first and second guide members with said first and second outer ends, respectively, for guiding said outer ends along circular paths in said transverse direction; wherein said first and second blocking means act on said first and second guide members, respectively, for selectively blocking the same and thereby said outer ends of said link means whereby said inner ends of said link means move along a first path when said first blocking means is operative and move along a second path when said second blocking means is operative; comprising a control member; means mounting said control member for movement in said first path; and biassing means for urging said control member along said first path to a blocking position engaging one of said inner ends for blocking movement of said link means away from said driven element in one transverse direction when said second blocking means fails so that driven element performs a working stroke in the opposite transverse direction, one of said inner ends engaging said control member and moving the same against said biassing means when said first blocking means is operative and said inner ends move along said first path in which said control member is located.

12. Drive arrangement as claimed in claim 11 wherein said one inner end has a projecting nose; and wherein said control member has a projecting blocking portion engaged by said nose when the same moves along said first path, and being located in said blocking position thereof on the same side of said nose remote from said driven element when said nose moves along said second path.

13. Drive arrangement as claimed in claim 11 wherein said biassing means include a contact spring engaged by said control member and having a first position when said control member is in said blocking position and a second position when said control member is moved out of said blocking position; and a contact engaged by said contact spring in one of said first and second positions for producing a signal indicating whether said driven element has performed a working stroke.

14. Drive arrangement as claimed in claim 1 wherein said actuating means include first and second stationary pivots, first and second guide members mounted on said stationary pivots, and first and second connecting pivots for connecting said first and second guide members with said first and second outer ends, respectively, for guiding said outer ends along circular paths in said transverse direction; wherein said first and second blocking means act on said first and second guide members, respectively, for selectively blocking the same and thereby said outer ends of said link means; wherein said first and second guide members rock in inner positions when none of said blocking means is operative; and comprising stop means between said first and second guide members engaging the same in said inner positions.

15. Drive arrangement as claimed in claim 1 wherein said actuating means include first and second stationary pivots, first and second guide members mounted on said stationary pivots, and first and second connecting pivots for connecting said first and second guide members with said first and second outer ends, respectively, for guiding said outer ends along circular paths in said transverse direction; and wherein said first and second blocking means including first and second selectively energizable electrostatic means for engaging and selectively blocking said first and second guide members.

16. Drive arrangement as claimed in claim 15 wherein said first and second guide members have first and second part-circular brake portions having centers coinciding with said stationary first and second pivots; and wherein said first and second electrostatic means include first and second part-circular semiconductor members in contact with said first and second brake portions, respectively, mounting means for mounting said semiconductor members for movement toward and away from said brake portions, first and second spring means for urging said semiconductor members into engagement with said brake portions, and means for selectively energizing said first and second semiconductor members.

17. Two sets of reciprocating drive arrangements as claimed in claim 1 wherein said first and second blocking means of said sets are arranged in parallel rows staggered to the first and second blocking means of the respective other row; wherein said link means of both sets are alternately located in a first common plane between said rows of blocking means; and wherein said drive means of said two sets are alternately located substantially in a second common plane substantially perpendicular to said first common plane and between first and second blocking means of one of said sets; and wherein said driven elements are punches forming a row substantially in said first common plane, the punches of said two sets alternating in said row of punches.

18. Two sets of drive arrangements as claimed in claim 17 wherein said inner ends of said links means of each of said two sets move along first paths when said first blocking means is operative, and move along second paths when said second blocking means is operative; comprising a row of control members, located between said first and second blocking means of the other set, alternating control members of said row cooperating with said link means of said two sets, respectively; means for mounting said control members for movement in said first paths; a row of contact springs respectively engaging said control members and urging the same along said first paths to a blocking position engaging one of said inner ends of said link means for blocking movement of said first link means away from said punch in one transverse direction when said second blocking means fails so that the respective contact spring is in a first position indicating a working stroke of said punch, one of said inner ends of said link means engaging said control member and moving the same out of said blocking position when a first blocking means is operative and said inner ends move along said second paths whereby the respective contact spring is moved to a second position; means for mounting said contact springs in a row; and a row of contacts respectively engaged by said contact springs in said first positions for producing signals indicating operation of the respective punches.

References Cited

UNITED STATES PATENTS

| | | | |
|---|---|---|---|
| 1,975,042 | 9/1934 | Higgitt et al. | 234—110 X |
| 2,675,078 | 4/1954 | Zenner | 234—109 |
| 3,064,882 | 11/1962 | Levin | 234—119 |
| 3,132,797 | 5/1964 | Turner et al. | 234—110 |

WILLIAM S. LAWSON, Primary Examiner

U.S. Cl. X.R.

234—110